US006624732B2

(12) United States Patent
Biltcliffe et al.

(10) Patent No.: US 6,624,732 B2
(45) Date of Patent: Sep. 23, 2003

(54) SUPERCONDUCTING MAGNET ASSEMBLY AND METHOD

(75) Inventors: Michael Norfolk Biltcliffe, Oxon (GB); M'hamed Lakrimi, Oxford (GB); Paul Antony Bruce Bircher, Oxfordshire (GB)

(73) Assignee: Oxford Instruments Superconductivity Limited, Oxon (GB)

( * ) Notice: Subject to any disclaimer, the term of this patent is extended or adjusted under 35 U.S.C. 154(b) by 0 days.

(21) Appl. No.: 10/237,985

(22) Filed: Sep. 10, 2002

(65) Prior Publication Data

US 2003/0057942 A1 Mar. 27, 2003

(30) Foreign Application Priority Data

Sep. 10, 2001 (GB) ............................................ 0121846

(51) Int. Cl.[7] ................................................. H02H 7/00

(52) U.S. Cl. .......................... 335/216; 361/19; 361/141

(58) Field of Search ........................... 335/216; 361/19, 361/141

(56) References Cited

U.S. PATENT DOCUMENTS 5,361,055 A * 11/1994 Peck .......................... 335/216

* cited by examiner

*Primary Examiner*—Ramon M. Barrera

(57) ABSTRACT

A superconducting magnet assembly comprises a superconducting magnet (1) which, under working conditions, generates a magnetic field in a working volume, the superconducting magnet being connected in parallel with a superconducting switch (3), the switch and magnet being adapted to be connected in parallel to a power source (4) whereby under working conditions with the switch (3) open, the magnet (1) can be energised by the power source to generate a desired magnetic field in the working volume following which the switch (3) is closed, characterised in that the assembly further comprises a resistor (5) connected in series with the switch (3), the resistor (5) and switch (3) being connected in parallel to each of the magnet (1) and the power source (4).

10 Claims, 2 Drawing Sheets

SUPERCONDUCTING MAGNET ASSEMBLY AND METHOD

The invention relates to a superconducting magnet assembly and a method for operating the assembly.

There are many applications in which superconducting magnets are used to create a stable magnetic field in a working volume. Examples include MRI, NMR, ICR and cyclotrons, in which the magnet is operated in the so-called "persistent mode". This involves connecting a near zero ohm connection between the start and end of a magnet once it has been energised. The techniques for achieving this are well known. The resulting field stability is then determined by the time constant of the magnet inductance and the total circuit resistance.

The time constant is defined as L/R where L is the magnet inductance in Henries, R is the total circuit resistance in Ohms and the time constant is measured in Seconds.

So unless L=infinity or R=zero then the resulting time constant will be finite, resulting in an exponential decay of both magnet current and field with time.

Depending upon the application, it is desirable to have the decay rate as close to zero as possible, typically the NMR application would like the decay rate to be less than 0.01 ppm/hour.

For most systems the magnet inductance is fixed by the geometry required to produce the very high homogeneous field and operating current required. So, in practice, the circuit resistance of the magnet will determine the field decay rate.

Until now, this field drift has been an accepted problem and the only solution has been to reenergise the magnet.

In accordance with a first aspect of the present invention, a superconducting magnet assembly comprises a superconducting magnet which, under working conditions, generates a magnetic field in a working volume, the superconducting magnet being connected in parallel with a superconducting switch, the switch and magnet being adapted to be connected in parallel to a power source whereby under working conditions with the switch open, the magnet can be energised by the power source to generate a desired magnetic field in the working volume following which the switch is closed, and is characterised in that the assembly further comprises a resistor connected in series with the switch, the resistor and switch being connected in parallel to each of the magnet and the power source.

In accordance with a second aspect of the present invention, a method of energising a superconducting magnet assembly according to the first aspect of the present invention comprises i) energising the magnet from the power source with the switch open;

ii) closing the switch; and iii) changing the current supply from the power source so as to reduce drift in the magnetic field generated in the working volume.

The problems outlined above in connection with magnetic field drift are overcome with this invention by adding a resistor in series with the switch. This enables the algebraic sum of the voltages in the circuit defined by the magnet, switch and resistor to be adjusted to, or close to, zero which is the condition required for zero magnetic field drift.

In contrast to conventional systems in which the power supplied to the magnet circuit is reduced to zero once the switch has been closed, the power supply must remain connected but it is believed that the benefit of achieving substantially longer periods of stable magnetic field outweigh the cost of maintaining the power supply.

Typically, the resistor has a resistance which is at least 10–100 times larger than the resistance of the magnet although a resistance in the range 1–1000 of the magnet resistance is possible. In addition, the resistor should have substantially no inductance.

There are various methods by which the correct current to achieve zero magnetic field drift can be determined.

In the first method, the resistance of the magnet can be determined. This can conveniently be achieved by providing a second superconducting switch in parallel with the magnet and power supply, the second switch being closed once the magnet has been powered up to a required field strength; and then monitoring the magnetic field decay so as to obtain a value for the magnet resistance. The decay rate=1/time constant and the time constant also is L/R (where L is the magnet inductance and R the magnet resistance). So the magnet resistance R=decay rate (in ppm/second) multiplied by the magnet inductance L. For example, if L=100 Henries and the decay rate=3.6 ppm/hour then 3.6 E-6/3600=1E-9 seconds the inductance L=100 gives R=1E-7 Ohms.

In a second approach, a voltmeter could be mounted across the magnet and the resistance determined directly in response to the passage of a known current.

In a third approach, the method further comprises:

iv) monitoring the magnetic field decay; and, repeating steps iii–iv with a different change in current in step iii to reduce the magnetic field decay. This iterative technique avoids the need for additional components.

The magnet may have any conventional construction utilizing either or both of low temperature and high temperature superconducting materials or other materials with low bulk resistivity. Since the power supply remains connected to the magnet, high temperature superconducting current leads are preferred to reduce heat conduction and minimise heat losses in the environment.

An example of a magnet assembly and method according to the invention will now be described with reference to the accompanying drawings, in which.

Figure 1:
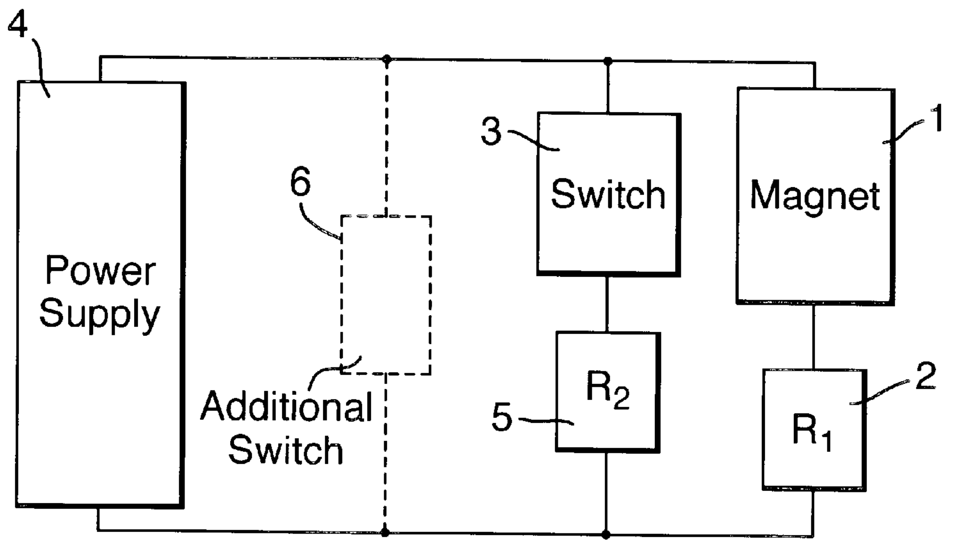
FIG. 1 is a schematic block diagram of the apparatus.

As shown in FIG. 1, the assembly comprises a superconducting magnet 1 of conventional form, the resistance of the magnet $R_1$ being shown separately at 2. The magnet is connected in parallel with a superconducting switch 3 and a power supply 4. The components described so far are conventional. In such a conventional system, the switch 3 is initially open and the magnet 1 is powered up by the power supply 4 until it generates the required magnetic field in the working volume. The superconducting switch 3 is then closed although no current begins to flow through this switch 3 until the power supply 4 is gradually deactivated. This deactivation causes current to flow in "persistent mode" through the series circuit formed by the magnet 1 (including the resistance $R_1$) and the switch 3 As explained above, however, due to the inherent resistance 2 ($R_1$) of the magnet 1 the magnetic field generated by the magnet 1 in a working volume will gradually drift or decay.

This is overcome in the present invention by inserting an additional resistor 5 ($R_2$) in series with the superconducting switch 3

Figure 2:
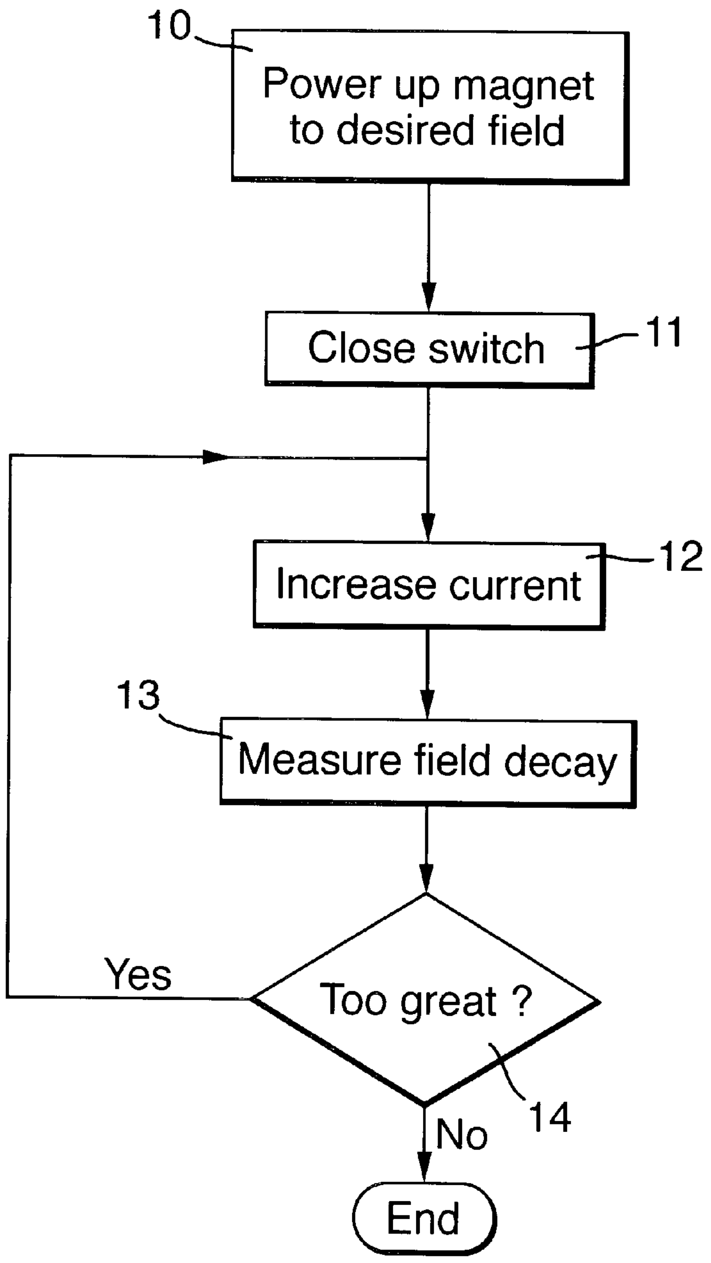
FIG. 2 is a flow diagram illustrating an example of the method.

Referring now to FIG. 2, with the switch 3 open, the magnet 1 is energised to the normal operating current I (step 10), the switch 3 is then closed (step 11) and then the current is further increased by ΔI (step 12) to the point where the additional current through the resistor 5 in series with the switch 3 generates an equal but opposite polarity voltage to exactly cancel the resistive voltage generated internally within the magnet 1 i.e. the algebraic sum of the circuit voltages is zero.

It should be understood that the increased power supply current does not flow through the magnet 1 (with the switch 3 closed) but only through the switch 3 and the resistor 5 This is because once the switch 3 has been closed the change in current in the power supply will divide and flow through both the switch circuit and the magnet circuit. The ratio between the two currents will be determined by the inverse ratio of the circuit inductance. As the magnet has a very large inductance (typically 100 Henries) and the switch inductance is very small (typically 100 nanoHenries), the current ratio is 1E-9, so for all practical considerations all the power supply current change flows in the switch circuit. It should also be remembered that here, unlike in the persistent mode, during the operation of the magnet 1, the power supply unit 4 remains connected and supplies the current I+ΔI to the circuit.

The desired condition for magnetic field stability is when the voltage drops across the magnet and the resistor 5 are equal and opposite around the magnet-switch loop, that is:

$$IR(\text{Magnet}) = \Delta IR(\text{of resistor } \mathbf{5}) \qquad [1]$$

Small variations in the power supply are filtered by the time constant of the circuit resistance and magnet inductance such that the resulting time varying field rate can be several orders of magnitude lower that would be the case as determined by the time constant of the magnet operated in the "persistent mode" or directly energised by the power supply alone.

Typical values might be:

Magnet inductance=100 henries.

Magnet resistance=1E-7 Ohms.

Resistor 5=1E-6 Ohms.

I Power Supply=100 Amperes.

ΔI over current=10 Amperes.

The magnet operated in the normal "persistent mode" will demonstrate a time constant of 1E9 seconds or a decay rate of 3.6 ppm/hour.

The same magnet operated in the "quasi-persistent" mode, that is using the resistor 5 as described above, will show a field stability of 3.6E-4 ppm/hr for a power supply variation of 1E-5 and a field stability of 3.6E-3 ppm/hr. for a power supply variation of 1E-4. It is therefore the instability in the power supply current that governs the field stability in this latter mode. Incidentally, if the power supply remained connected in the persistent mode, then it will be appreciated that a much larger field instability would be produced compared with the quasi-persistent mode, as the time constant of the circuit would be smaller.

In order to arrive at the desired zero decay condition, it is necessary to set the current change ΔI correctly. There are various ways in which this could be achieved.

In the first approach, an additional superconducting switch 6 could be connected in parallel with the switch 3 and resistor 5 Initially, the power supply 4 is activated to power-up the magnet 1 to the desired field strength, the switch 6 is closed and the power supply deactivated. The magnetic field decay is then monitored (step 13) using a, for example conventional, NMR technique and from this the magnet inductance can be calculated by measuring the NMR resonant frequency to determine the rate of change of field with time. Knowing the magnet inductance and the magnet operating current, the equivalent magnet resistive voltage can be calculated. The magnet resistive voltage is then divided by the value of the resistor 5 to give the value for the increased current ΔI from the power supply using equation (1) above. The switch 6 will then be opened and the process described above carried out with the precalculated additional current ΔI applied following closure of the switch 3.

In a second approach, a voltmeter (not shown) could be attached across the magnet 1 to determine its resistance 2.

In a third approach, a rough value for ΔI is supplied (step 12) and the field decay or drift measured in step 13 If that drift is too great (step 14) the power supply is increased and the process of steps 12 and 13 repeated. This set of steps can be iterated until the required field decay is achieved.

Of course, it is assumed in this case that an increase in current is necessary to achieve the required field decay or drift but it may be that a decrease in current is required and so step 12 would be adjusted accordingly.

The quasi-persistent mode will now be explained in greater detail.

Ordinarily according to the known method, in the persistent mode the decay in the magnet is dominated by the magnet resistor 2 ($R_1$) in series with the magnet. In this situation the voltage drop across the magnet inductor due to a change in the current within it, is equal to the voltage drop across the magnet resistance 2, that is:

$$L\frac{\Delta I_1}{\Delta t} = R_1 I_1 \qquad [2]$$

with L being the magnet inductance, $I_1$ the current flowing through the magnet and $R_1$ the magnet resistance 2.

It follows therefore that, for a particular magnet, as the NMR proton frequency is proportional to the current in the magnet, the decay Δf in the magnet's operational proton frequency f is given by:

$$\Delta f = \frac{\Delta t \cdot R_1 \cdot f}{L} \qquad [3]$$

For example with frequency f=400 MHz magnet, L=58 Henries and a nominal $R_1$=4 μΩ, this would give a theoretical rate in the frequency of about 100,000 PHz/hour ("Phz/hour" denoting a decay in the proton resonant frequency).

In contrast to the above, according to the quasi-persistent mode, the current power supply 4 remains connected to the magnet and the switch 3 is closed such that current flows through both the magnet 1 and, in parallel, through the switch 3 and resistor 5. Since the power supply remains connected, it supplies a direct current, $I_2^0$, through the resistor 5 (having a resistance $R_2$), in addition to the direct current $I_1^0$ flowing through the magnet resistance 3 (here having a resistance value denoted $R_1$). In the static mode, the voltage generated across $R_2$ should be the same as that across the magnet resistor $R_1$. Therefore due to the voltages being equal:

$$I_2^0 = \frac{R_1}{R_2} I_1^0 \qquad [4]$$

Any change $\delta I_2$ within the current $I_2(t)(=I_2^0+\delta I_2)$ in the switch 3 and resistor 5 will be accompanied or balanced by a time varying change $\delta I_1$ in the current $I_1(t)(=I_1^0+\delta I_1)$. The power supply is kept operational and therefore the deciding factor in determining the decay rate is the stability of the power supply. To consider this further, small mathematical notation is now adopted.

As a result of a small change in current from the slight instability of the power supply 4, by a voltage balance calculation:

$$L\frac{\delta I_1}{\delta t} + R_1(I_1^0 + \delta I_1) = R_2(I_2^0 + \delta I_2) = L\frac{\delta I_1}{\delta t} + R_2 I_2^0 + R_1 \delta I_1 \quad [5]$$

A cancellation of terms gives:

$$L\frac{\delta I_1}{\delta t} + R_1 \delta I_1 = R_2 \delta I_2 \quad [6]$$

And also, as the total current I is $I_1+I_2$, the total change in the current is:

$$\delta I = \delta I_1 = \delta I_2 \quad [7]$$

Substituting $\delta I_2 = \delta I - \delta I_1$, this leads to:

$$L\frac{\delta I_1}{\delta t} + R_1 \delta I_1 = R_2(\delta I - \delta I_1) \quad [8]$$

Re-arranging terms:

$$\delta I_1 = \delta I \frac{R_2}{\left(\frac{L}{\delta t}\right) + (R_1 + R_2)} \quad [9]$$

The importance of the stability of the current supply becomes paramount. For a power supply with a current stability of 10 ppm/hour, the change $\delta I_1$ is reduced to 3.6E-4 ppm/hour. For times $\delta t << L/(R_1+R_2)$, $\delta I_1$ is given by:

$$\delta I_1/\delta t = \delta I(R_2/L) \quad [10]$$

To test the above analysis, an experimental superconducting magnet of near zero resistance and having an inductance of 57.52 Henries was deliberately placed in series with a finite nominal resistance $R_1$ of 4 $\mu\Omega$. The decay rate was measured under working conditions both in the persistent and quasi-persistent modes.

In the persistent mode the magnet was operated using a current of 95.5 A at a proton frequency of 400.419 MHz, generating a voltage drop across the 4 $\mu\Omega$ resistor of 0.382 mV. The resulting decay rate was measured as 111,000 PHz/hour.

In the quasi-persistent mode a 90 $\mu\Omega$ resistor (resistor 5 in FIG. 2) was placed in parallel with the magnet (and therefore in series with the switch 3). An increased current of 99.256 A was used to take account of the parallel resistor. This produced a measured decay rate of +49 Phz/hour, indicating that the current was slightly larger than optimum and as a result the proton frequency actually moved upwards. However, it can be seen that the overall rate of change in the proton frequency was substantially reduced. An improved value can therefore be achieved by the use of a slightly smaller current of 99.254 A. This result demonstrates that the 0.01 ppm/hour decay rate (described earlier) is achievable with the present invention, even with a high magnet resistance of 4 $\mu\Omega$.

Using the equations above, to generate a 0.382 mV voltage across a 90 $\mu\Omega$ resistor requires a current of 4.24 A giving a total current of 99.7 A.

Assuming a drift in the power supply current of 10 ppm/hour, for a current of 99.7 A (that is for approximate current for 400 MHz operation) the expected instability in the current supply is about 1 mA/hour.

Using $\delta I/\delta t$=1 mA/hour with $R_2$=90 $\mu\Omega$, this gives a rate of change of current in the magnet of $\delta I_1/\delta t$=5.6E-6 A/hour. This equates to a calculated decay rate of 23 PHz/hour.

It can be seen therefore that the provision of the parallel resistance $R_2$ and the use of the power supply during the operation of the magnet can substantially improve the field stability.

As a further test using the experimental magnet system, the current was reduced by 2 mA to simulate a change in the power supply current. No corresponding step evidence of this change was found in the decay trace, only a small change of 34 PHz/hour in the decay slope and this result is consistent with the large time constant of the magnet circuit.

In some superconducting magnets, the resistance of the magnet itself ($R_1$) is very small, for example 1E–10Ω to 1E–13Ω thereby producing very long time constants for the magnet circuit in the persistent mode. However, other superconducting magnets have higher resistance values. One particular example of these is high temperature superconductors which often have a “finite” resistance and therefore such magnets are susceptible to greater instability in their magnetic fields. Fabrication processes can also cause increases in the resistance of the more traditional low temperature superconducting materials. It is for these types of magnets, having finite resistance values, that the invention is particularly suited since the time constants of the magnet circuits can be substantially reduced.

What is claimed is:

1. A superconducting magnet assembly comprising a superconducting magnet which, under working conditions, generates a magnetic field in a working volume, the superconducting magnet being connected in parallel with a superconducting switch, the switch and magnet being connected in parallel to a power source whereby under working conditions with the switch open, the magnet can be energised by the power source to generate a desired magnetic field in the working volume following which the switch is closed, characterised in that the assembly further comprises a resistor connected in series with the switch, the resistor and switch being connected in parallel to each of the magnet and the power source.

2. An assembly according to claim 1, wherein the resistor has a resistance in the range 1–1000 times the resistance of the magnet, preferably 10–100 times.

3. An assembly according to claim 2, wherein the power source, magnet and resistance are arranged such that, in use, the instability in the generated magnetic field is less than substantially 0.01 ppm/hour.

4. A method of energising a superconducting magnet assembly according to claim 2, the method comprising i) energising the magnet from the power source with the switch open;

ii) closing the switch; and iii) changing the current supply form the power source so as to reduce drift in the magnetic field generated in the working volume.

5. A method according to claim 4, further comprising step iv monitoring the magnetic field decay; and, repeating steps iii–iv with a different change in current in step iii to reduce the magnetic field decay.

6. An assembly according to claim 1, wherein the power source, magnet and resistance are arranged such that, in use, the instability in the generated magnetic field is less than substantially 0.01 ppm/hour.

7. A method of energising a superconducting magnet assembly according to claim 6, the method comprising i) energising the magnet from the power source with the switch open;

ii) closing the switch; and iii) changing the current supply form the power source so as to reduce drift in the magnetic field generated in the working volume.

8. A method according to claim 7, further comprising step iv monitoring the magnetic field decay; and, repeating steps iii–iv with a different change in current in step iii to reduce the magnetic field decay.

9. A method of energising a superconducting magnet assembly according to claim 1, the method comprising i) energising the magnet from the power source with the switch open;

ii) closing the switch; and iii) changing the current supply form the power source so as to reduce drift in the magnetic field generated in the working volume.

10. A method according to claim 9 further comprising step iv monitoring the magnetic field decay; and, repeating steps iii–iv with a different change in current in step iii to reduce the magnetic field decay.

* * * * *